United States Patent
Canni et al.

(12)

(10) Patent No.: US 10,914,709 B2
(45) Date of Patent: Feb. 9, 2021

(54) INTERNAL/EXTERNAL DISCRIMINATION OF METAL LOSS DEFECTS

(71) Applicant: PII Pipetronix GmbH, Stutensee (DE)

(72) Inventors: Giovanni Canni, Cramlington (GB); Jochen Giese, Stutensee (DE)

(*) Notice: Subject to any disclaimer, the term of this patent is extended or adjusted under 35 U.S.C. 154(b) by 568 days.

(21) Appl. No.: 15/657,730

(22) Filed: Jul. 24, 2017

(65) Prior Publication Data

US 2019/0025256 A1  Jan. 24, 2019

(51) Int. Cl.
*G01N 27/90* (2006.01)
*G01N 27/904* (2021.01)

(52) U.S. Cl.
CPC ....... *G01N 27/9046* (2013.01); *G01N 27/904* (2013.01)

(58) Field of Classification Search
CPC .. G01N 27/9046; G01N 27/904; G01N 27/00; G01N 27/72; G01N 27/82; G01N 27/90; G01N 27/906
See application file for complete search history.

(56) References Cited

U.S. PATENT DOCUMENTS

| | | | |
|---|---|---|---|
| 2016/0258568 A1* | 9/2016 | Mayorov | H04Q 9/00 |
| 2017/0261469 A1* | 9/2017 | Chang | E21B 47/00 |
| 2018/0217097 A1* | 8/2018 | Tada | G01N 27/902 |

* cited by examiner

*Primary Examiner* — Alexander Satanovsky
*Assistant Examiner* — Mark I Crohn
(74) *Attorney, Agent, or Firm* — Mintz Levin Cohn Ferris Glovsky and Popeo, PC; Lisa Adams

(57) ABSTRACT

In one embodiment, a method of discriminating defects is provided. The method can include receiving data characterizing a first portion of a magnetic field, a second portion of the magnetic field, and a speed associated with a second sensor that acquired the second portion of the magnetic field. The method can also include discriminating, using the received data, a defect in a pipe as one of internal and external. The method can further include providing data characterizing the defect as one of internal and external.

24 Claims, 13 Drawing Sheets

INTERNAL/EXTERNAL DISCRIMINATION OF METAL LOSS DEFECTS

BACKGROUND

Eddy current testing (ECT) can be used to detect defects in pipes made of conducting material. In ECT, a coil of conductive wire ("eddy current sensor") is excited with an alternating current that results in the generation of an alternating magnetic field. When the coil of conductive wire approaches the pipe made of conducting material, the alternating magnetic field can generate a current in the pipe. The generated current ("Eddy current") can generate a second magnetic field that can interact with the coil. This interaction can manifest itself as a change in the impedance of the coil, which can be detected, for example by measuring the current flowing through the coil and/or potential drop across the coil.

Eddy current may be largest close to the surface of the pipe facing the coil. The eddy current can depend on changes in conductivity of portions of the pipe in the path of the eddy current. Presence of defects (e.g., due to metal loss) in the pipe can change its magnetic and electrical properties. This can affect the eddy current, which can be detected as a change in the impedance of the coil. Because the eddy current can be largest close to the surface of the pipe facing the coil, ECT may be effective in detecting a surface defect. An ECT detector can be attached to a pipeline inspection gauge (PIG) that can travel inside a pipe. As the ECT detector travels inside the pipe it can detect defects on the internal surface of the pipe (internal defects). However, because of the presence of ambient magnetic fields (e.g., magnetic fields generated by magnets in the PIG) the ECT may also detect defects that are located on the pipe's external surface and it may be unclear whether a defect detected by the ECT is internal or external.

SUMMARY

In general, discriminating between internal defects and external defects of a structure is provided.

In one embodiment, a method of discriminating defects is provided. The method can include receiving data characterizing a first portion of a magnetic field, a second portion of the magnetic field, and a speed associated with a second sensor that acquired the second portion of the magnetic field. The method can also include discriminating, using the received data, a defect in a pipe as one of internal and external. The method can further include providing data characterizing the defect as one of internal and external.

One or more of the following features can be included in any feasible combination.

In one embodiment, the discriminating can include computing a discrimination threshold based on the second portion of the magnetic field and the speed of the second sensor. The discriminating can also include comparing a first threshold value associated with data characterizing the first portion of the magnetic field acquired by a first sensor to the discrimination threshold. The discriminating can further include determining the defect as one of internal and external based on the comparison.

In another embodiment, the discrimination threshold can be computed by scaling a second threshold value associated with the second portion of the magnetic field by the speed associated with the second sensor and adding a noise threshold associated with the first sensor.

In one embodiment, the second threshold value can be a peak amplitude of a radial component, the radial component characterizing a magnetic flux leakage directed along a radius of the pipe. In another embodiment, the defect can be determined to be internal when the first threshold value is greater than the discrimination threshold, and the defect is determined to be external when the first threshold value is smaller than the discrimination threshold.

In one embodiment, the first threshold value can be a peak amplitude of the first portion of the magnetic field in vicinity of the defect. In another embodiment, the first portion of the magnetic field can be generated in part by a current in the pipe, the current in the pipe induced by the first sensor. In yet another embodiment, the second sensor can acquire the second portion of the magnetic field in vicinity of the defect.

In one embodiment, a non-transitory computer program product storing instructions, which when executed by at least one data processor of at least one computing system, can implement a method that can include receiving data characterizing a first portion of a magnetic field, a second portion of the magnetic field, and a speed associated with a second sensor that acquired the second portion of the magnetic field. The method can also include discriminating, using the received data, a defect in a pipe as one of internal and external. The method can further include providing data characterizing the defect as one of internal and external.

One or more of the following features can be included in any feasible combination.

In one embodiment, the discriminating can include computing a discrimination threshold based on the second portion of the magnetic field and the speed of the second sensor. The discriminating can also include comparing a first threshold value associated with data characterizing the first portion of the magnetic field acquired by a first sensor to the discrimination threshold. The discriminating can further include determining the defect as one of internal and external based on the comparison.

In another embodiment, the discrimination threshold can be computed by scaling a second threshold value associated with the second portion of the magnetic field by the speed associated with the second sensor and adding a noise threshold associated with the first sensor.

In one embodiment, the second threshold value can be a peak amplitude of a radial component, the radial component characterizing a magnetic flux leakage directed along a radius of the pipe. In another embodiment, the defect can be determined to be internal when the first threshold value is greater than the discrimination threshold, and the defect is determined to be external when the first threshold value is smaller than the discrimination threshold.

In one embodiment, the first threshold value can be a peak amplitude of the first portion of the magnetic field in vicinity of the defect. In another embodiment, the first portion of the magnetic field can be generated in part by a current in the pipe, the current in the pipe induced by the first sensor. In yet another embodiment, the second sensor can acquire the second portion of the magnetic field in vicinity of the defect.

In one embodiment, a system can include at least one data processor and memory storing instructions which, when executed by the at least one data processor, can cause the at least one data processor to perform operations that can comprise receiving data characterizing a first portion of a magnetic field, a second portion of the magnetic field, and a speed associated with a second sensor that acquired the second portion of the magnetic field. The operation can also include discriminating, using the received data, a defect in a pipe as one of internal and external. The method can further include providing data characterizing the defect as one of internal and external.

One or more of the following features can be included in any feasible combination.

In one embodiment, the discriminating can include computing a discrimination threshold based on the second portion of the magnetic field and the speed of the second sensor. The discriminating can also include comparing a first threshold value associated with data characterizing the first portion of the magnetic field acquired by a first sensor to the discrimination threshold. The discriminating can further include determining the defect as one of internal and external based on the comparison.

In another embodiment, the discrimination threshold can be computed by scaling a second threshold value associated with the second portion of the magnetic field by the speed associated with the second sensor and adding a noise threshold associated with the first sensor.

In one embodiment, the second threshold value can be a peak amplitude of a radial component, the radial component characterizing a magnetic flux leakage directed along a radius of the pipe. In another embodiment, the defect can be determined to be internal when the first threshold value is greater than the discrimination threshold, and the defect is determined to be external when the first threshold value is smaller than the discrimination threshold.

In one embodiment, the first threshold value can be a peak amplitude of the first portion of the magnetic field in vicinity of the defect. In another embodiment, the first portion of the magnetic field can be generated in part by a current in the pipe, the current in the pipe induced by the first sensor. In yet another embodiment, the second sensor can acquire the second portion of the magnetic field in vicinity of the defect.

Various aspects of the disclosed subject matter may provide one or more of the following capabilities. The defect discrimination provides for a reliable discrimination of detected defects as internal or external (e.g., by reducing false positives of internal/external defect detection). The defect discrimination can expedite the detection process by reducing the time needed to analyze the detected data. The defect discrimination can be achieved through improvements in the hardware and software of existing detection systems. This can be cost effective as existing detection systems, which can be very expensive, can be improved rather than having to be replaced.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein.

Pipelines, such as those that carry oil and gas, may be susceptible to internal metal loss, which may result from corrosion caused by the oil or natural gas. As a result, pipelines can be regularly monitored for internal defects using a sensor (such as an eddy current sensor) designed to measure the magnetic properties of the internal pipe wall as the sensor travels through the internal bore of the pipe. Sensor output can vary in the presence of external defects (e.g., metal loss in the external wall of the pipeline) as well as internal defects. Such can be used in combination with a pipeline inspection gauge that can create a strong background magnetic field, which can adversely impact the sensor. Accordingly, in order to properly monitor a pipe under these conditions, sensor measurements can be modified or processed to compensate for the effect the strong background magnetic field has on the sensor. This can enable identification of defects as internal or external and, once the nature of the defect is known, the appropriate remedial measure can be taken.

Figure 1:
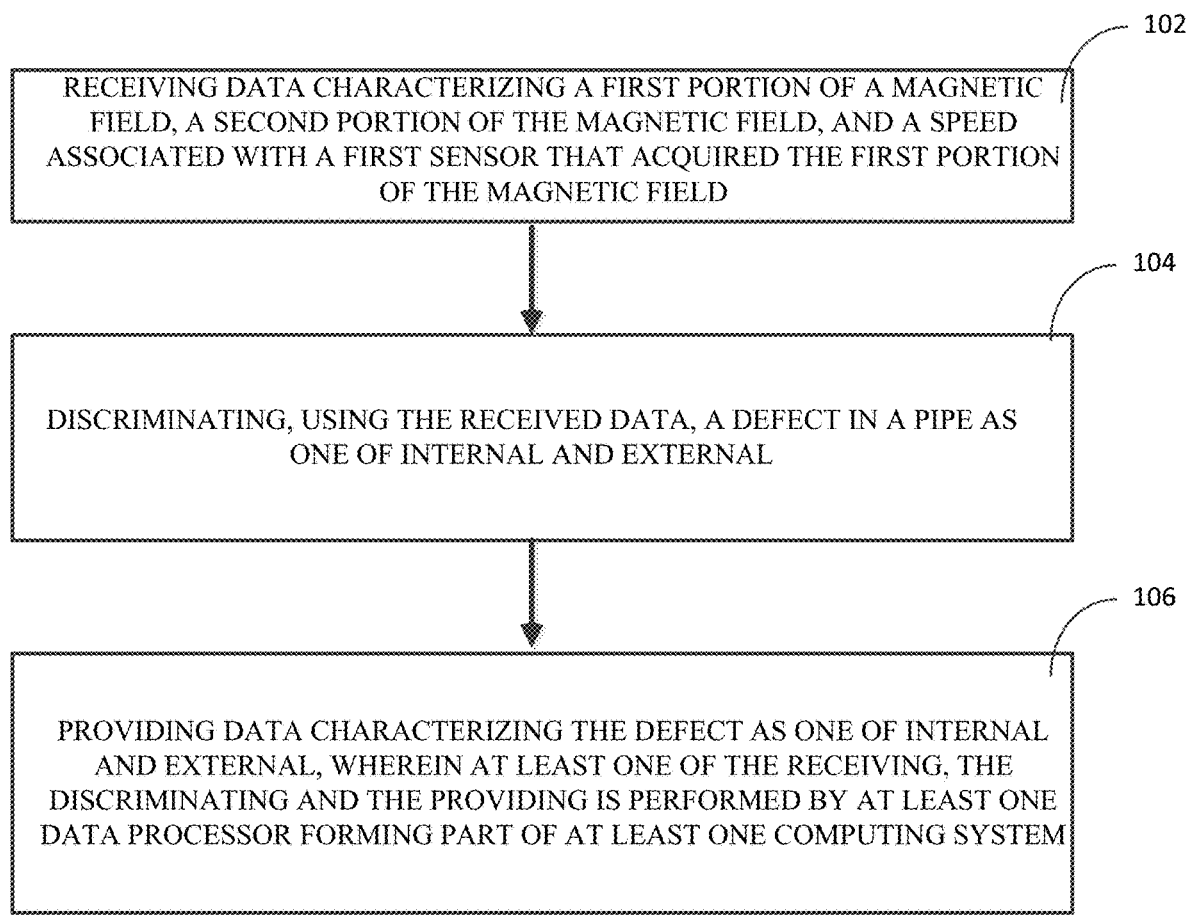
FIG. 1 describes an exemplary method of discriminating a defect in a pipe.

FIG. 1 describes an exemplary method of discriminating a defect in a pipe as external or internal. At 102, data characterizing a first portion of a magnetic field, a second portion of the magnetic field, and a speed associated with a first sensor that acquired the first portion of the magnetic field can be received. For example, a first portion of the magnetic field can be associated with a current generated in the pipe, and the second portion of the magnetic field can be associated with an external magnetic field source that apply magnetic flux on the pipe. The first portion and the second portion of the magnetic field can be detected by a detection system that can includes multiple magnetic field detectors. The detection system can communicate the data characterizing the detected magnetic fields. The detection system can include a velocity sensing device that can detect the velocity of the detector (e.g., accelerometer, odometer, and the like) and communicate the velocity data. The communicated data (e.g., data characterizing the first and second portions of the magnetic field, and the velocity data) can be received by a computing system.

Figure 2A:
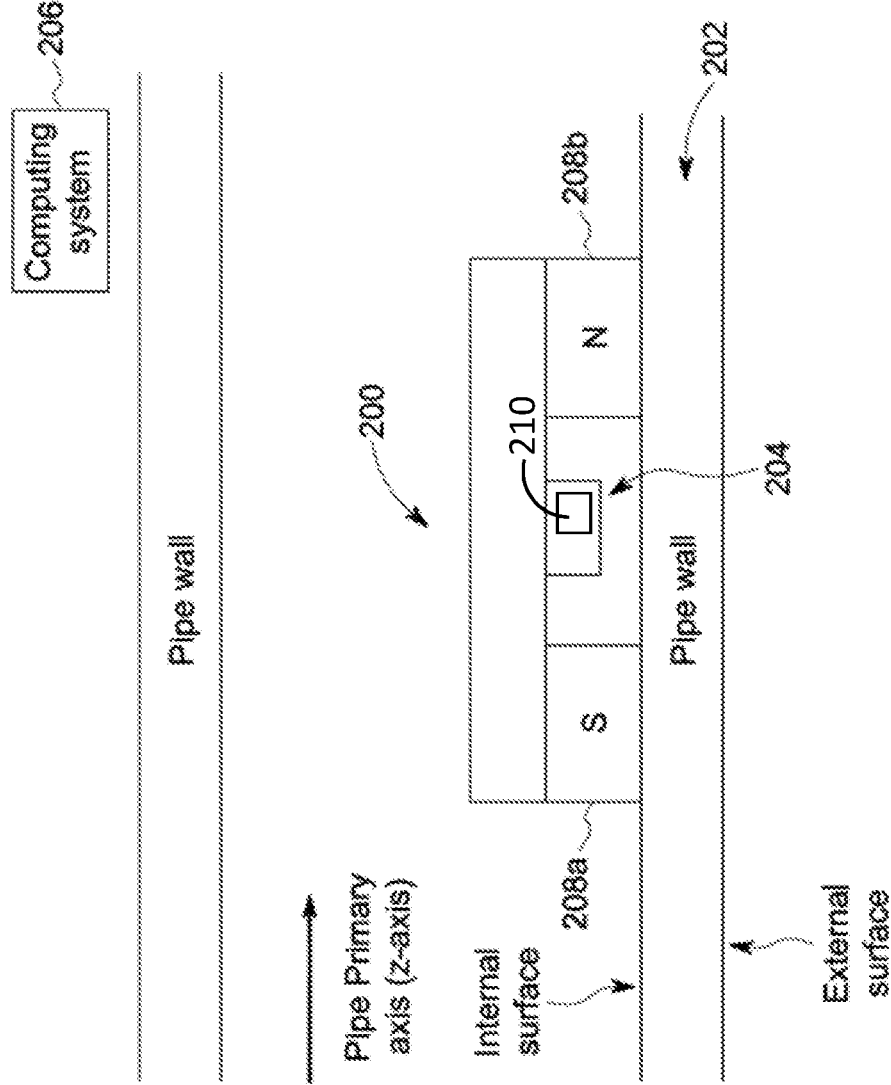
FIG. 2A illustrates an exemplary pipeline inspection gauge (PIG) configured to detect defects in a pipe.
Figure 2B:
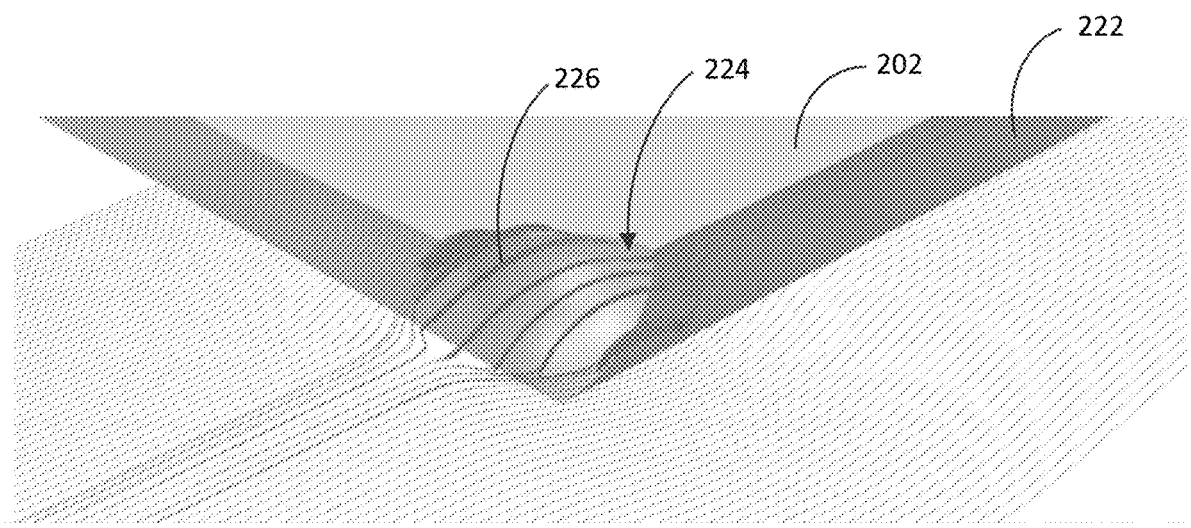
FIG. 2B illustrates magnetic flux leakage for the pipe in FIG. 2A.

FIG. 2A illustrates a pipeline inspection gauge (PIG) 200 that can perform various maintenance operations on the pipe wall 202. The PIG 200 can include a detection system 204 that can detect various magnetic fields around the pipe wall 202 that can be representative of the defects in the pipe wall 202. The detection system 204 can provide a computing device 206 with data related to detected magnetic fields, velocity of the detection system 204, and the like. The PIG 200 can include a pair of magnets 208a and 208b that can generate magnetic flux through the pipe wall 202. Due to properties of the pipe wall 202 (e.g., shape of the pipe, permeability of the material of the pipe, and the like), the magnetic flux can be channeled through the pipe. Presence of anomalies in the pipe—for example, defects close to or on the internal surface of the pipe ("internal defects"), defects away from the internal surface ("external defects") or on the external surface of the pipe, pipe welding, and the like—can lead to leakage of the magnetic flux ("magnetic flux leakage"). As illustrated in FIG. 2B, magnetic flux 222 can be channeled through the pipe wall 202. When the magnetic flux encounters a defect 224, a magnetic flux leakage 226 (MFL) can extend out of the surface of the pipe wall 202, and can interact with the detection system 204 located in the vicinity of the pipe wall 202 (e.g., the detection system can be located such that it can detect MFL from the pipe wall 202). For example, the portion of the MFL that is perpendicular to the internal surface/extends along the radius of the pipe ("radial component") can be detected by a conductive coil in the detection system 204.

Figure 3:
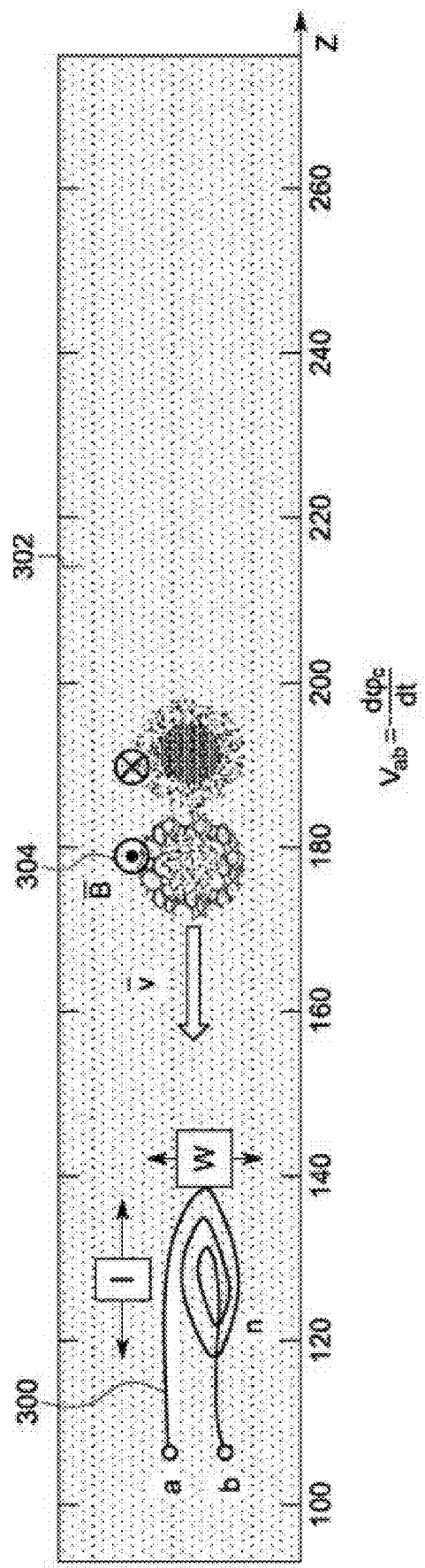
FIG. 3 illustrates an exemplary detection of radial component of magnetic flux leakage (MFL)

As shown, in FIG. 3, a conductive coil 300 can move axially (along z-direction) across the pipe 302. The conductive coil 300 can be oriented, for example, parallel to the internal surface of the pipe. The conductive coil 300 can detect a change in magnetic field 304 which can emanate in or out of the pipe. The change in the magnetic field 304 (e.g., radial component of the magnetic field if the pipe has a circular cross section in the plane perpendicular to the z axis) can induce a potential $V_{ab}$ across the ends "a" and "b" of the coil which is proportional to the rate of change of the magnetic field, area of the conductive coil, and the like. The induced potential can be expressed as:

$$V_{ab} = -\frac{d\varphi_c}{dt} \quad \text{(Equation 1)}$$

where $\varphi_C$ is the magnetic flux through the coil. Equation 1 represents Faraday Newmann Lens Law. For FIG. 3, the change in magnetic flux with time (e.g., as described in Equation 1) can also be expressed as:

$$\frac{d\varphi_c}{dt} = A_{eq}\frac{dB}{dz}\frac{dz}{dt} \quad \text{(Equation 2)}$$

where $A_{eq}$ is the area of the coil, $$\frac{dB}{dz},$$

is the change in radial magnetic field along the axis, and $$\frac{dz}{dt}$$

is the velocity of the coil along the axis. As the area of the coil, rate of change of magnetic field along the z-axis or the velocity of the coil along the z axis increases (or decreases), the magnitude of the induced voltage can increase (or decrease). The induced potential can also depend on the size of the defect. As the size of the defect increases, MFL can increase. As the MFL increases, the change in radial magnetic field along the axis (represented by $$\frac{dB}{dz})$$

can increase resulting in an increase in the induced potential. The induced potential can also depend on the distance between the coil 300 and the pipe 302.

Coil 300 can be coupled to a detector that can detect the induced potential, for example, by detecting a change impedance of the coil 300 due to induced potential. The detector can save the detected data (e.g., induced potential data, changing impedance data, etc.) at a local memory device and/or can transmit the data. For example, the detected data can be transmitted to an external computing device (e.g., computing device 206) either directly or via one or more intermediary devices (e.g., routers). Transmission of data can occur in real-time or at a later time (e.g., periodically, at a predetermined time, and the like). The detected data can be time dependent: detected data can include time data that can be related to the time of detection of the data. Additionally or alternatively, the detected data can be velocity dependent: detected data can include data that can be related to the velocity of the IDOD sensor at the time of detection of the data.

The detection system 204 can include an eddy current sensor (also referred to as IDOD sensor) that can generate an alternating magnetic field which can induce an eddy current that can be largest close to the internal surface of the pipe wall 202. The eddy current can generate a second magnetic field. As the eddy current changes with time, the generated second magnetic field can also change with time. The changing magnetic field can result in a changing magnetic flux through the IDOD coil which can also induce a potential across the IDOD (e.g., as described in Equation 1 above).

Metal defects in the path of the eddy current can affect the eddy current. The effect of defects on the eddy current can be detected by the IDOD sensor (e.g., via an effect on the second magnetic field). Since the eddy current primarily flows close to the surface facing the IDOD sensor (e.g., internal surface), the IDOD sensor has been traditionally used to detect internal defects. However, the IDOD sensor can also be affected by MFL from the pipe wall 202, for example, as described in Equation 1 and 2 above. The IDOD sensor can interact with the spatially varying radial component of the MFL as it moves along the axis of the pipe as described above. MFL can be greater close to those regions of the pipe wall 202 that has, for example, an internal defect, an external defect, pipe welding, and the like. The PIG 200 (and the IDOD sensor) can move along the along the surface of the pipe, for example, dragged by the fluid flowing in the pipe wall 202. As the IDOD sensor moves, it can detect a change in MFL. The interaction between the IDOD sensor and the spatially changing MFL can lead to an induced potential across the coil in the IDOD sensor which can be detected by a detector as described above.

Interaction between the IDOD sensor and MFL can have several effects on the defect detection process. For example, the IDOD sensor can detect external defects or defects associated with welding in the pipe, which it may not have been able to detect in the absence of MFL. Detection by the IDOD sensor can also depend on the speed associated with the IDOD sensor. This speed can be related to, for example, speed of the PIG to which the IDOD sensor is attached. Detection by the IDOD sensor can also depend on the size of the defect.

Figure 4:
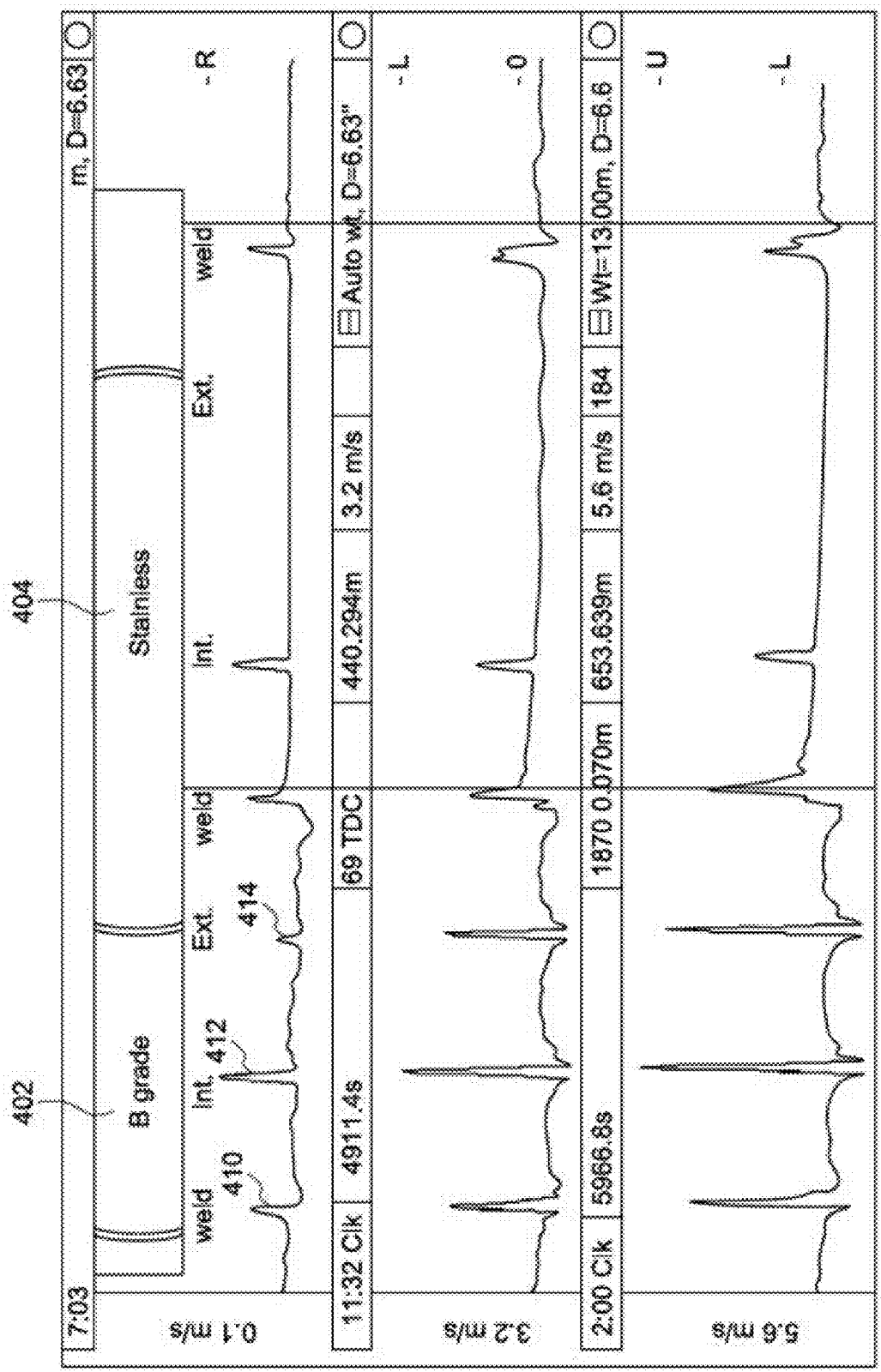
FIG. 4 illustrates exemplary outputs of an eddy current sensor for varying speeds of the IDOD sensor.

FIG. 4 illustrates exemplary outputs of an IDOD sensor for varying relative speeds between the IDOD sensor and a B-grade pipe 402 and stainless steel pipe 404. For the B-grade pipe 402, the IDOD sensor detects a weld in the pipe 410, and internal defect 412 and an external defect 414 at speed 0.1 m/sec (meters per second). As the speed of the IDOD sensor increases to 3.2 m/sec and 5.6 m/sec IDOD output corresponding to weld 410, internal defect 412 and external defect 414 increases. Increase in IDOD sensor output for external defect 414 and weld 410 is due to an increase in the change of MFL as the speed of the IDOD sensor increases (e.g., as described in Equation 2). Increase in IDOD sensor output for internal defects can also increase as the speed of the IDOD sensor increases. However, this increase may not be as significant as the increase corresponding to external defect and the weld. This can be due to the fact that output related to internal defects can be dominated by eddy current generated in the pipe 402 (due to magnetic field generated by the IDOD coil) that may not depend on the speed of the IDOD sensor. For the stainless steel pipe 404, there is almost no MFL for the external defect and small MFL due to welding. This can result in the IDOD sensor not detecting the external defect. The internal defect, which can be detected due to eddy current generation (and may not need MFL to be detected), can be detected the IDOD sensor for stainless steel.

Internal and external defects can be discriminated by adding a second sensor and a velocity sensor 210 (e.g., accelerometer, odometer, and the like) to the detection system 204. The second sensor can be placed in the vicinity of the IDOD sensor. This can allow the second sensor to detect a change in MFL that can be similar to the change in NFL detected by the IDOD sensor (e.g., as described in FIG. 2A). The second sensor can also be placed relative to the IDOD sensor such that it may not detect the magnetic field generated by the eddy current induced in the pipe (e.g., pipe wall 202) by the IDOD coil. A velocity sensor can detect velocity of the second sensor and/or IDOD sensor to which the second sensor and the IDOD sensor can be attached. The velocity sensor can detect the velocity information at certain time intervals (e.g., periodically) or upon receipt of a signal from an external controller (e.g., computing device 206).

Data related to detection by the IDOD and/or second sensor (e.g., data related to induced potential/impedance on a coil of the IDOD and second sensor, related time of detection data, and the like) and/or the velocity data from the velocity sensor can be transmitted. The transmitted data can be received by the computing device 206.

Referring again to FIG. 1, at 104, using the data received at 102 (e.g., by the computing device 206), a defect in a pipe is discriminated as one of internal or external. The computing device can receive the detection data from the IDOD and the second sensor and the velocity data. Based on the data from the second sensor and the velocity data, the computing device 206 can calculate one or more discrimination thresholds. For example, discrimination thresholds can be calculated for the various defects in the pipe wall 202.

Figure 5:
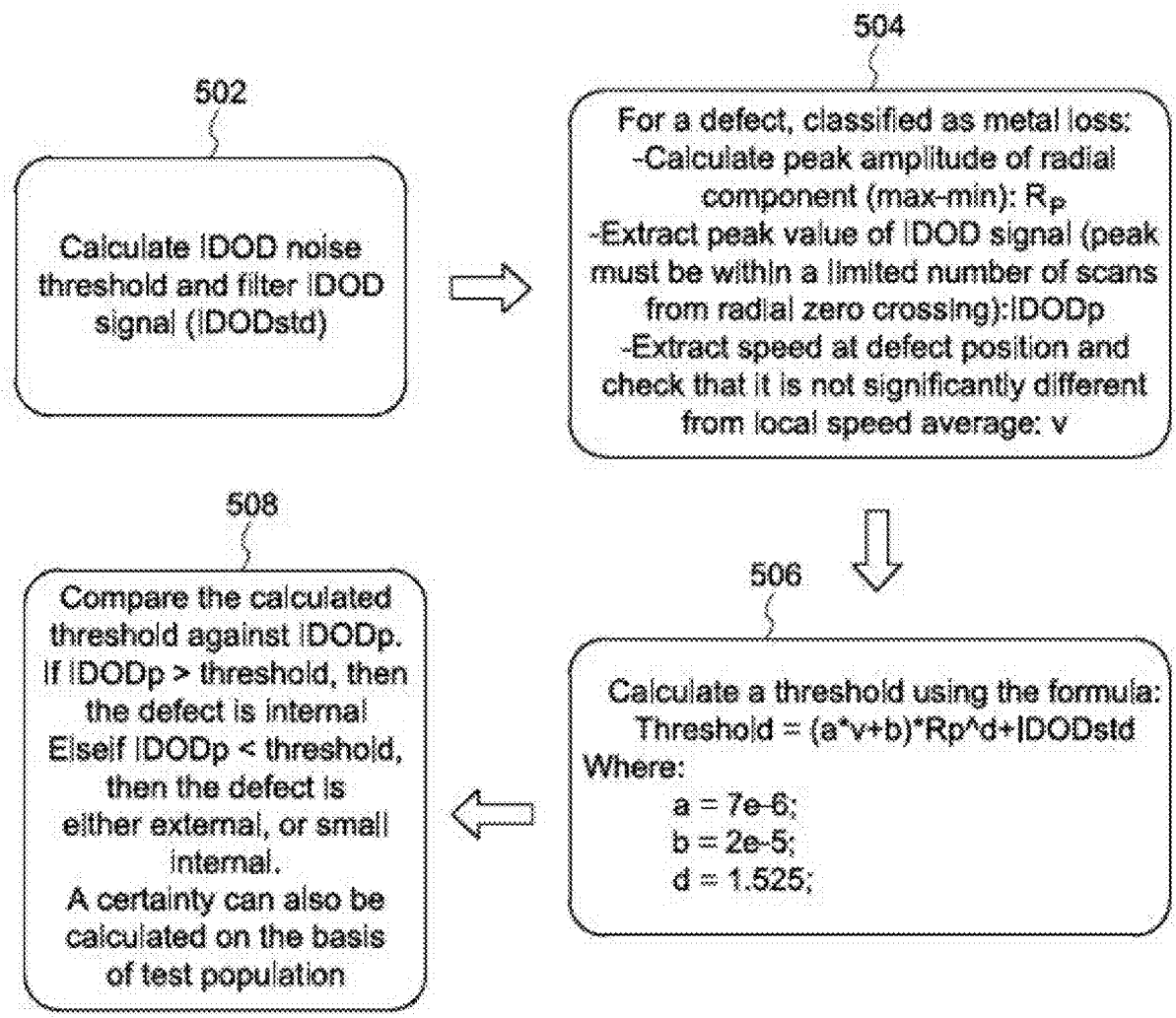
FIG. 5 illustrates an exemplary method for discriminating defects in a pipe.

FIG. 5 illustrates an exemplary method of calculation of the discrimination threshold. At 502, the noise threshold ("IDODstd") of the IDOD sensor can be determined. Noise threshold information of the IDOD can be provided to the computing device a priori. In some implementations, the computing system 206 can access an IDOD noise thresholds database and select noise threshold value corresponding to the IDOD sensor of the detection system.

At 504, a threshold radial component ($R_p$) of the MFL detected by the second detector (e.g., Hall effect sensor) can be calculated. The radial component of the MFL can, for example, be calculated from induced potential/impedance data from the second sensor at various times. Various statistical techniques can be used to determine the threshold radial component. The threshold radial component can, for example, be the peak radial component (e.g., radial component with the largest amplitude) from a plurality of radial components detected by the second detector in vicinity of a defect. Alternately, threshold radial component can be a root mean square value (RMS) calculated from a plurality of detected radial component in the vicinity of a defect. The computing device (e.g., computing device 206) can determine whether the second detector is in the vicinity of a defect by tracking a change in detected MFL, by comparing the detected MFL with a database of detected MFL, and the like. Radial component can be calculated for MFL detected by the second detector at various times (e.g., periodically). A threshold value of the output of the IDOD (IDODp) can also be calculated. This can be done, for example, by applying techniques described above for threshold radial component to output of IDOD sensor.

At 506, the discrimination threshold for a defect can be calculated by applying the threshold formula:

$$(a \times v + b) \times Rp^d + IDODstd \qquad \text{(Equation 3)}$$

where a, b and d are predetermined values associated with the IDOD sensor, "v" is the velocity associated with the second sensor for the defect for which discrimination threshold is being calculated and IDODstd is the noise threshold for the second sensor.

At 508, the threshold IDOD value (IDODp) can be compared to the discrimination threshold. If it the threshold IDOD value is greater than the discrimination threshold, the defect is considered to be internal. If it the threshold IDOD value is smaller than the discrimination threshold, the defect is considered to be external. In some implementations, a certainty level can be calculated for a defect. The certainty level can indicate a level of confidence associated with the discrimination of the defect.

Referring again to FIG. 1, at 106, data characterizing the defect as one of internal and external can be provided. The data characterizing the defect can be provided through means, including displaying, transmitting, storing and processing. The data can include a characterization of the defect and the discrimination threshold associated with the defect. In some implementations, a memory device can maintain a database having defect data for various defects. Contents of the defect database can be displayed on a screen.

Figure 6A:
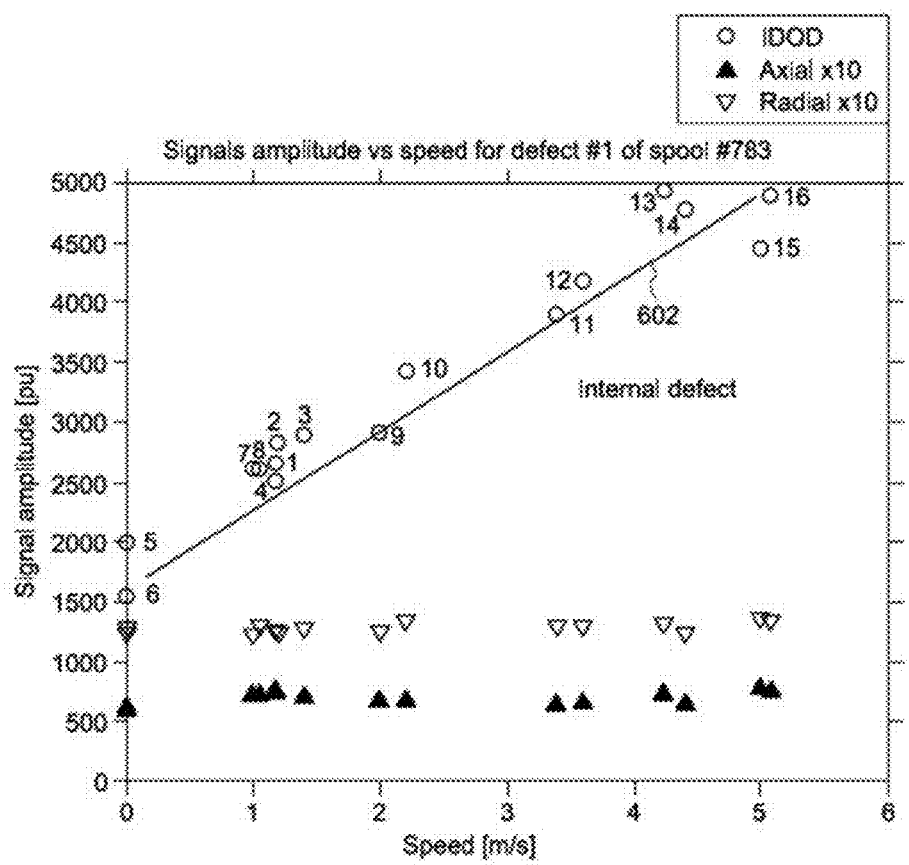
FIG. 6A illustrates a plot of signal amplitude outputs of the exemplary eddy current sensor for an example internal defect in a pipe versus speed of the IDOD sensor.

FIG. 6A is a plot illustrating experimental signal amplitude outputs of the IDOD sensor (denoted by "o") for internal defects in a pipe versus speed of the IDOD sensor (or the PIG associated with the IDOD sensor). The solid line 602 represents a linear regression for IDOD signal amplitude for internal defects. The solid line 602 indicates that there is a monotonic increase in the signal amplitude with the speed of the IDOD sensor.

Figure 6B:
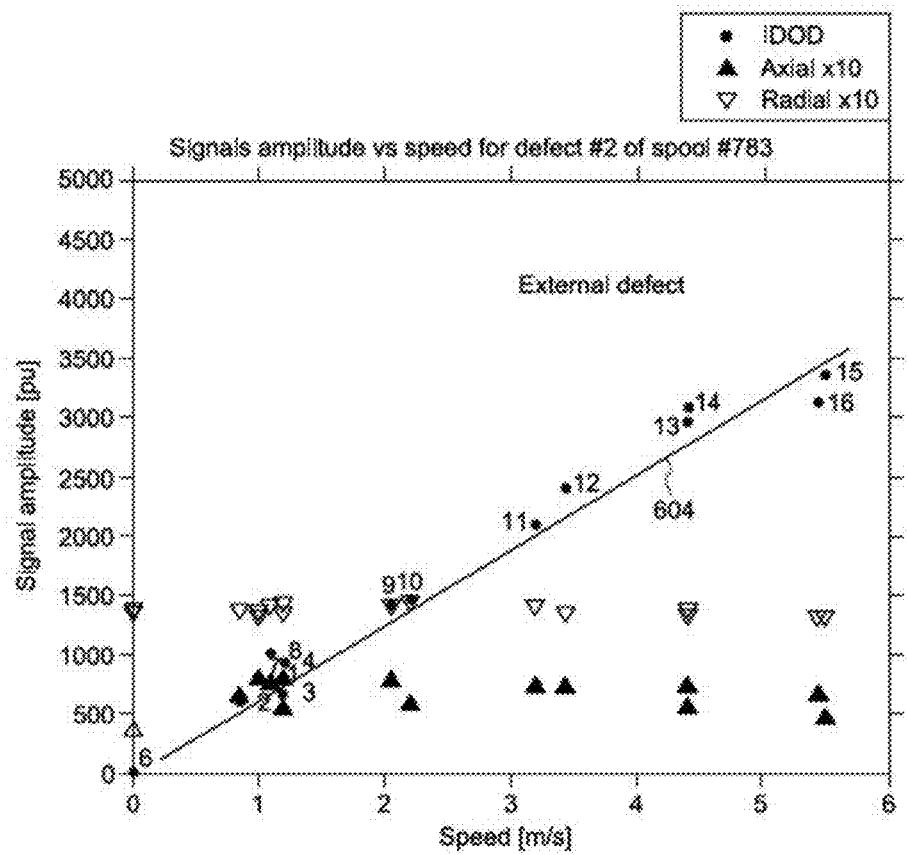
FIG. 6B illustrates a plot of signal amplitude outputs of the exemplary eddy current sensor for an example external defect in a pipe versus speed of the IDOD sensor.

FIG. 6B is a plot illustrating experimental signal amplitude outputs of the IDOD sensor (denoted by "o") for external defects in a pipe versus speed of the IDOD sensor (or the PIG associated with the IDOD sensor). The solid line 604 represents a linear regression for IDOD signal amplitude for external defects. The solid line 604 indicates that there is a monotonic increase in the signal amplitude with the speed of the IDOD sensor.

Figure 7A:
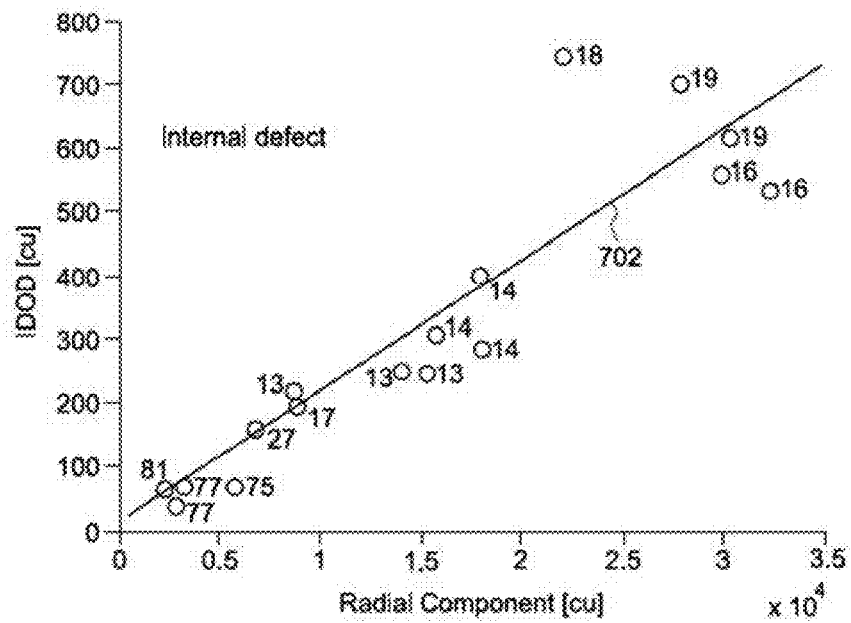
FIG. 7A is a plot of signal amplitude outputs of the exemplary eddy current sensor for large internal defects in a pipe versus magnitude of the radial component of MFL, at fixed speed.

FIG. 7A is a plot illustrating signal amplitude outputs of the IDOD sensor (denoted by "o") for large internal defects in a pipe versus magnitude of the radial component of MFL. The IDOD sensor in FIG. 7A has a velocity of 5 m/sec. The solid line 702 represents a linear regression for IDOD signal amplitude for internal defects. The solid line 702 indicates that there is a monotonic increase in the signal amplitude with the radial component of the magnetic flux leakage. As illustrated in FIG. 7A, IDOD outputs for internal defects are scattered mostly below the solid line, which indicates that external defects are properly classified as external.

Figure 7B:
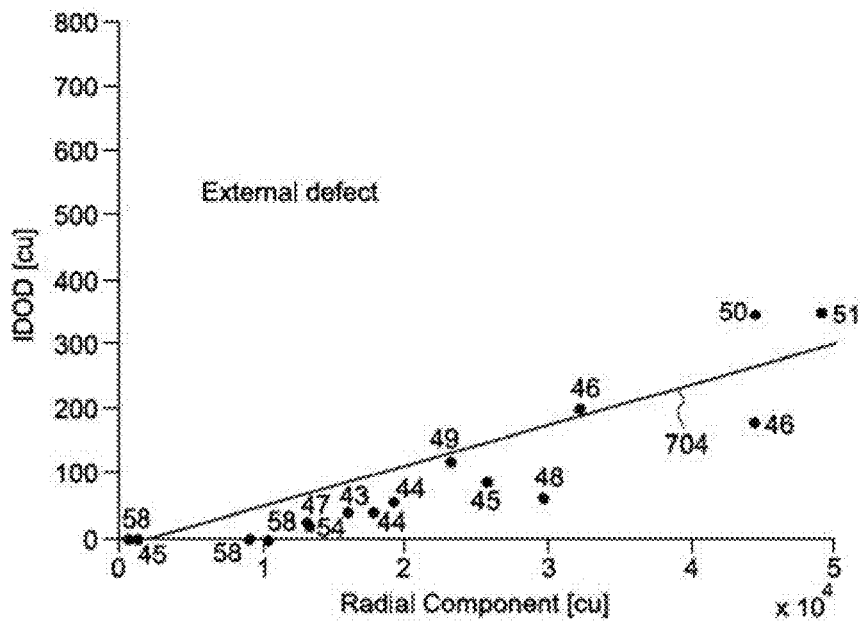
FIG. 7B is a plot of signal amplitude outputs of the exemplary sensor for an example large external defect in a pipe versus magnitude of the radial component of MFL, at fixed speed.

FIG. 7B is a plot illustrating signal amplitude outputs of the IDOD sensor (denoted by "o") for large external defects in a pipe versus magnitude of the radial component of MFL. The IDOD sensor in FIG. 7B has a velocity of 5 m/sec. The solid line 704 represents a linear regression for IDOD signal amplitude for external defects. The solid line 704 indicates that there is a monotonic increase in the signal amplitude with the radial component of the magnetic flux leakage.

Figure 8:
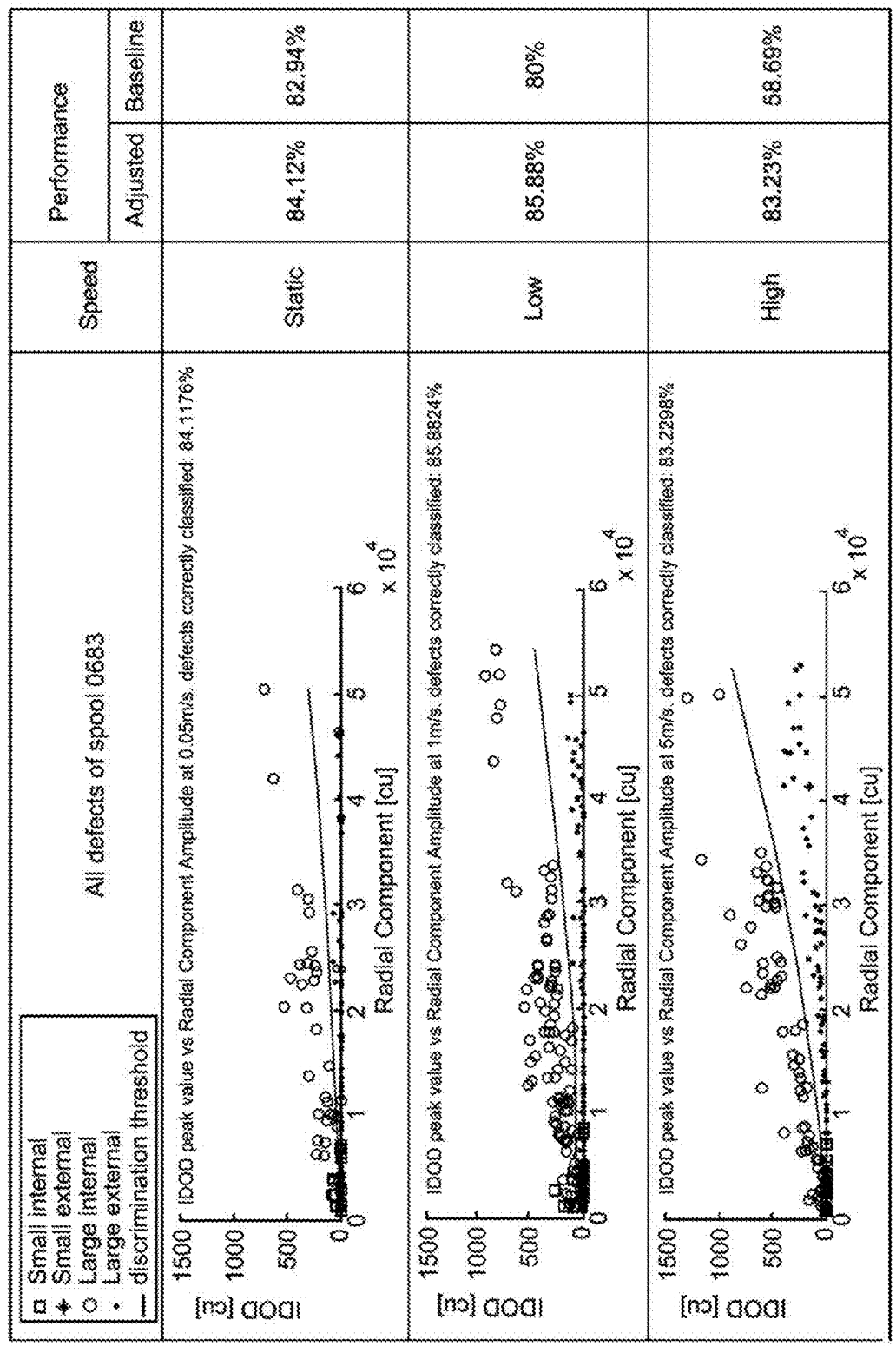
FIG. 8 illustrates exemplary plots of signal amplitude outputs of the exemplary eddy current sensor for defects in a pipe versus magnitude of the radial component of MFL at various speeds of the IDOD sensor.

FIG. 8 illustrates plots of signal amplitude outputs of the IDOD sensor for defects in a pipe versus magnitude of the radial component of MFL for various speeds of the IDOD sensor (e.g., static, low and high). The dashed lines in each of the plots represent discrimination thresholds at various radial component of MFL. These discrimination thresholds can be calculated, for example, by Equation 3. FIG. 8 also illustrates an exemplary performance metric of an internal-external defect discrimination method, for example, as described in FIG. 5. The baseline performance metrics represent the accuracy in discriminating between external and internal defects using traditional methods. In the example implementation, as the speed of the IDOD sensor increases, traditional methods of discrimination can become less accurate. However, the discrimination method (e.g., as described in FIG. 5) can accurately discriminate between internal and external defects even as the speed of IDOD sensor increases.

Figure 9:
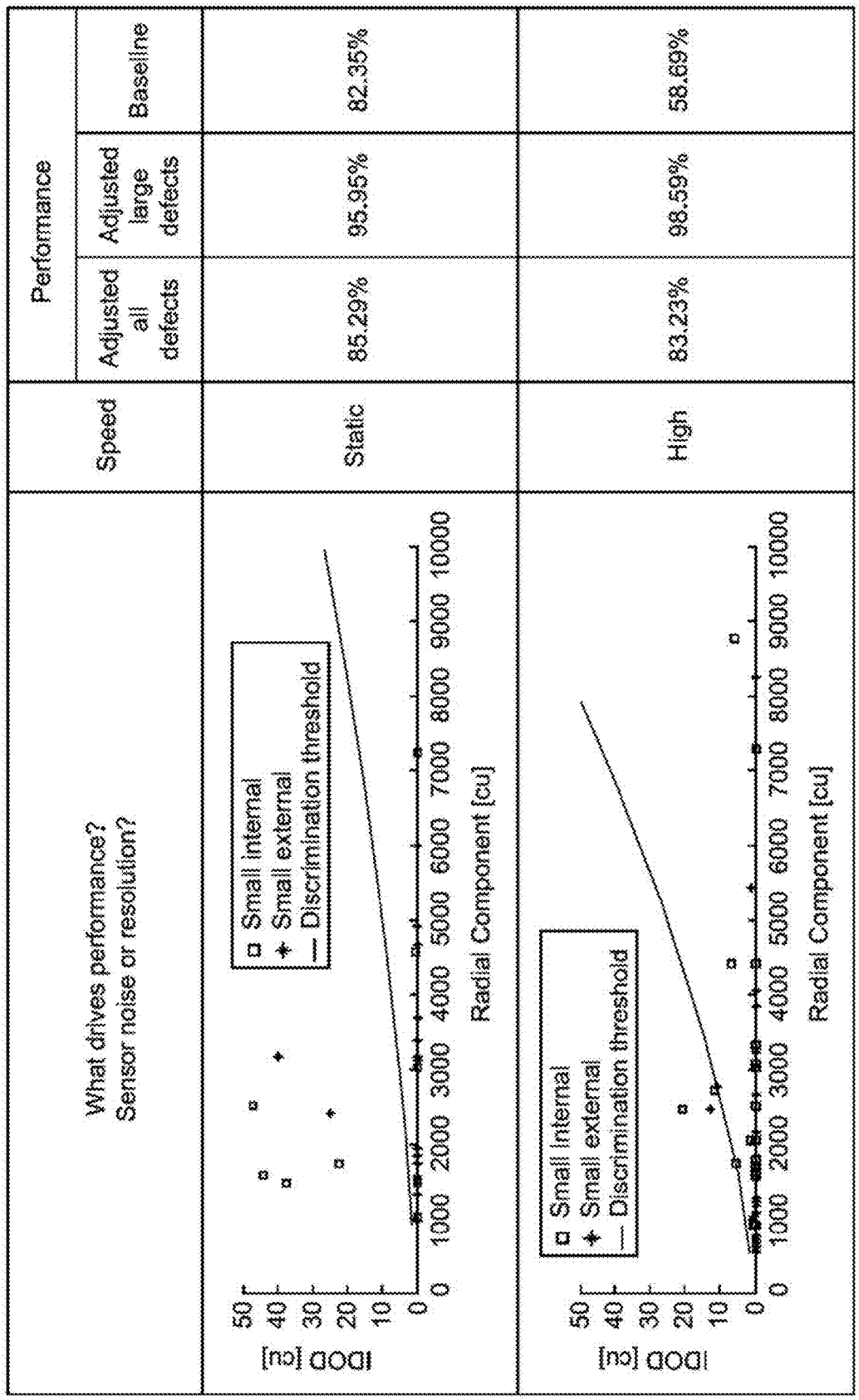
FIG. 9 illustrates plots of signal amplitude outputs of the IDOD sensor for small internal defects and small external defects versus magnitude of the radial component of MFL at various speeds of the IDOD sensor.

FIG. 9 illustrates plots of signal amplitude outputs of the IDOD sensor for large/small internal/external defects in a pipe versus magnitude of the radial component of MFL for various speeds of the IDOD sensor (e.g., static, high, and the like). The dashed lines in each of the plots represent discrimination thresholds at various radial component of MFL. Values of various points on the dashed line can be calculated, for example, by Equation 3. FIG. 9 also illustrates an exemplary performance metric of an internal-external defect discrimination method, for example, as described in FIG. 5. The baseline performance metrics represent the accuracy in discriminating between external and internal defects using traditional methods. FIG. 9 also presents the performance of the discrimination method (e.g., as described in FIG. 5) for all defects and for large defects only. In some instances, as the speed of the IDOD sensor increases, accuracy of traditional defect discrimination decreases.

Figure 10:
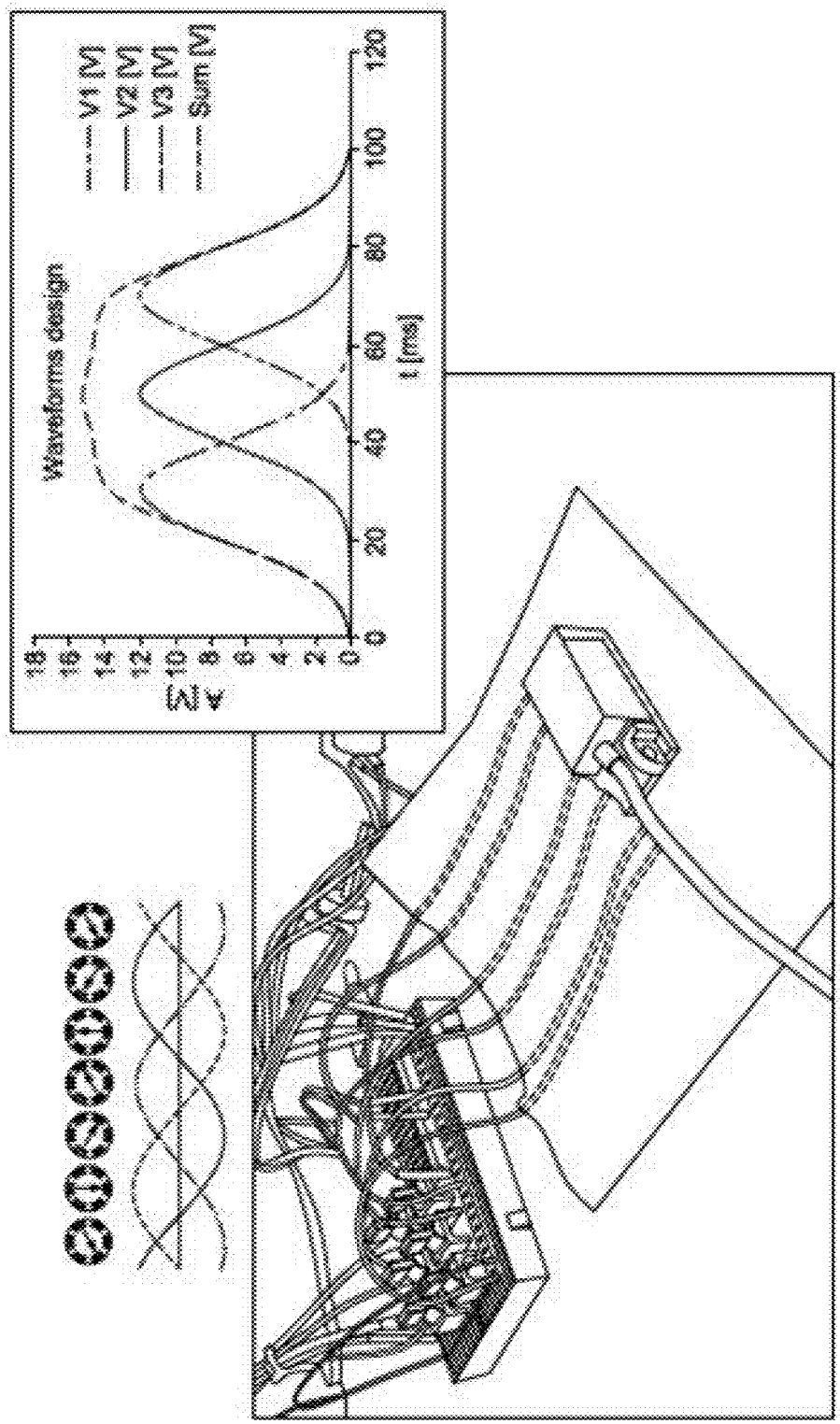
FIG. 10 illustrates an exemplary experimental setup that simulates defects at various depths relative to IDOD detector for various relative velocities between the detector and the defects.
Figure 11:
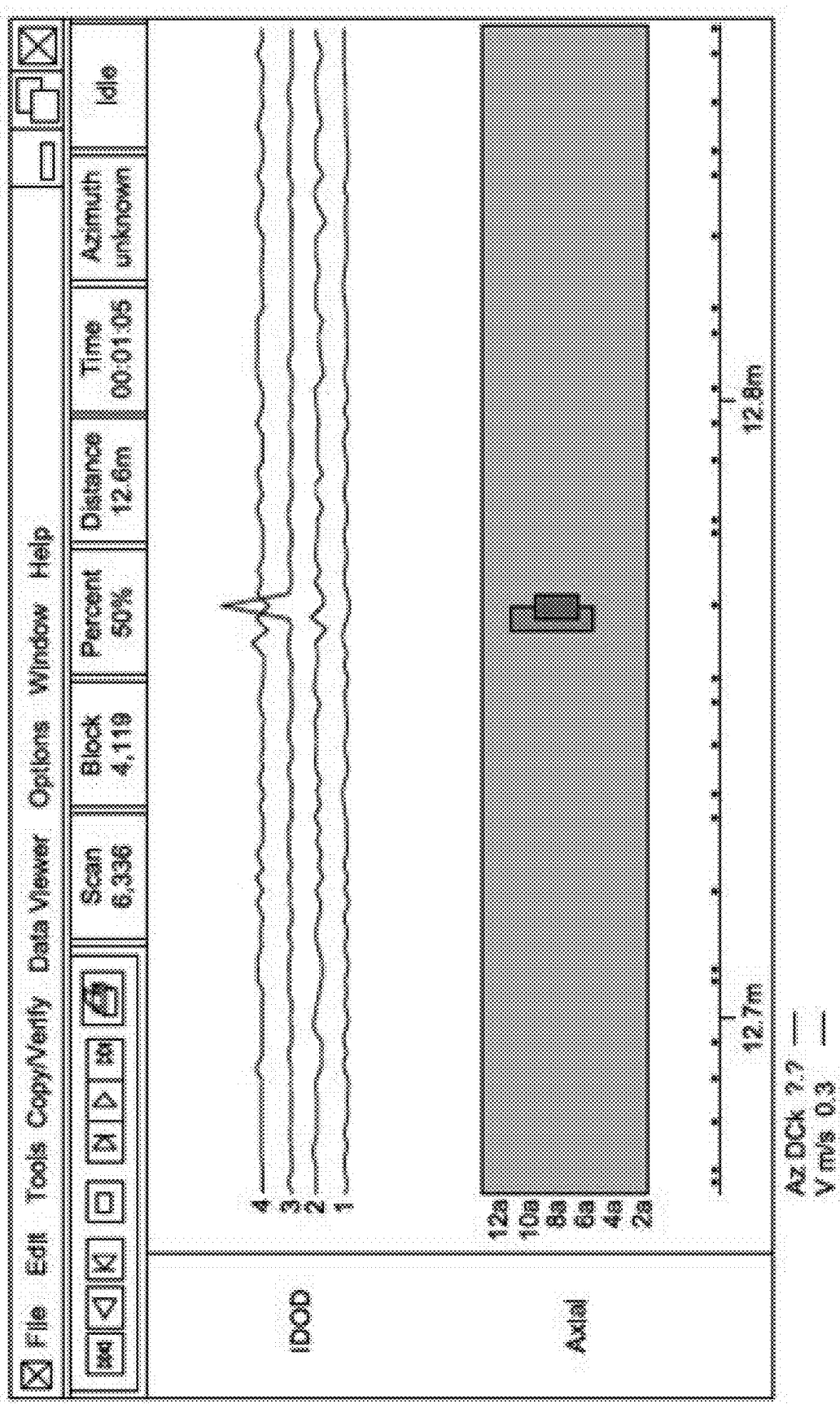
FIG. 11 illustrates an exemplary output of the IDOD detector in FIG. 10.
Figure 12A:
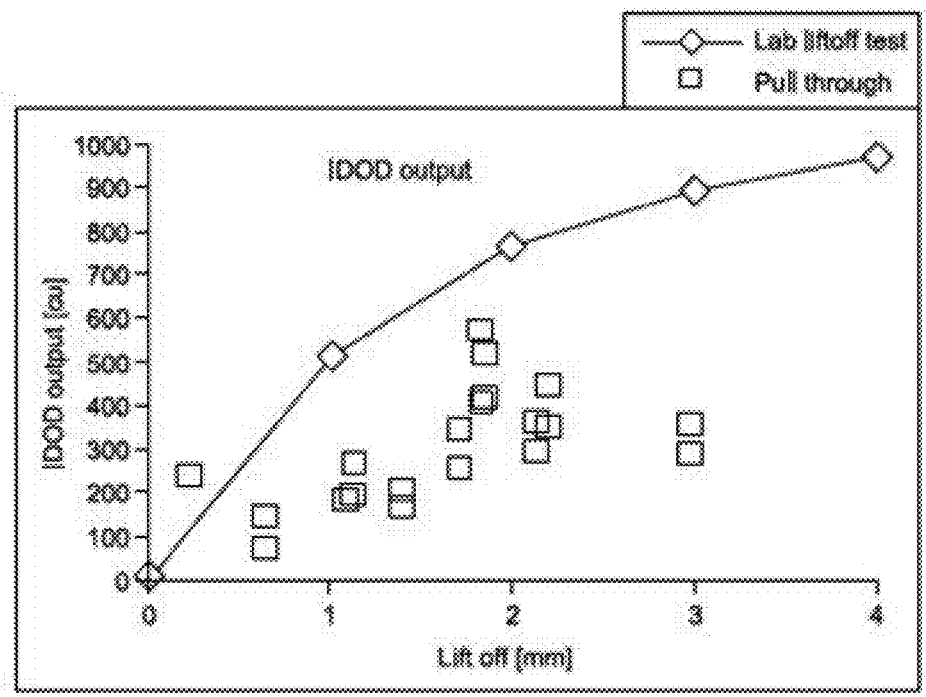
FIG. 12A illustrates IDOD output for various lift-off distances for pull through and lab-lift off tests.
Figure 12B:
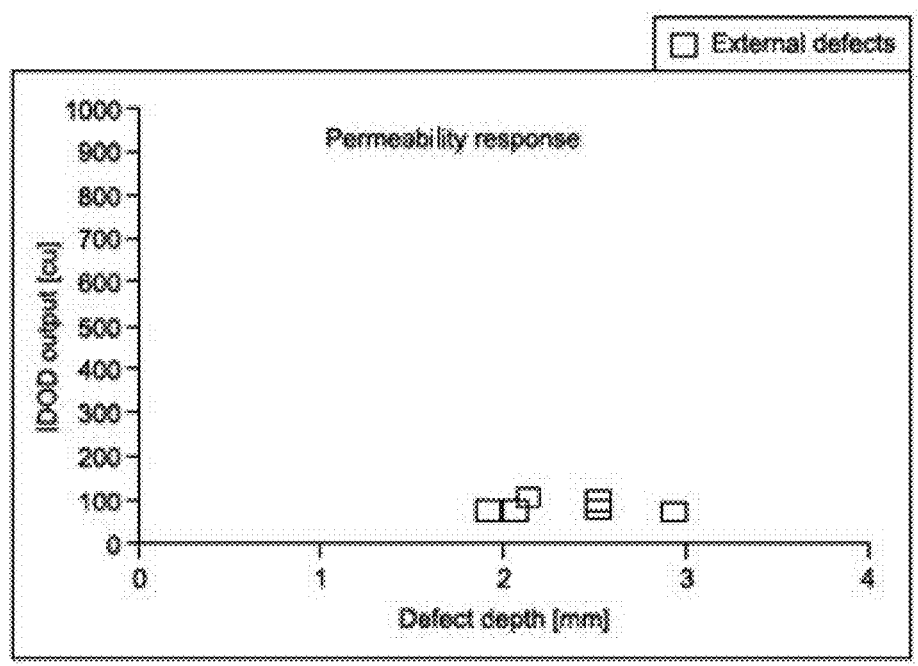
FIG. 12B illustrates IDOD output for various large external defect depths at low IDOD speed.

FIG. 10 illustrates an exemplary experimental setup that simulates defects at various depths relative to IDOD detector and for various relative speeds between the detector and the defects. FIG. 11 illustrates an exemplary output of the IDOD detector in FIG. 10. FIG. 12A illustrates IDOD output for various lift-off distances for pull through and lab-lift off tests. FIG. 12B illustrates IDOD output for various defect depths.

Other embodiments are within the scope and spirit of the disclosed subject matter. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
   receiving data characterizing a first portion of a magnetic field detected by a first sensor, a second portion of the magnetic field detected by a second sensor, and a speed associated with the second sensor detected by a velocity sensor coupled to the first or the second sensor,
      wherein the first sensor, the second sensor and the velocity sensor are included in a pipeline inspection gauge configured to inspect a pipe, wherein the second portion of the magnetic field includes magnetic flux leakage directed along a radius of the pipe;
   discriminating, using the received data, a defect in a pipe as one of internal and external, the discriminating comprising:
      computing a discrimination threshold based on the second portion of the magnetic field and the speed of the second sensor,
      comparing a first threshold value associated with data characterizing the first portion of the magnetic field to the discrimination threshold,
      determining the defect as one of internal and external based on the comparison; and
   providing data characterizing the defect as one of internal and external,
      wherein at least one of the receiving, the discriminating, and the providing is performed by at least one data processor forming part of at least one computing system.

2. The method of claim 1, wherein the discrimination threshold is computed by scaling a second threshold value associated with the second portion of the magnetic field by the speed associated with the second sensor and adding a noise threshold associated with the first sensor.

3. The method of claim 2, wherein the second threshold value is a peak amplitude of a radial component, the radial component characterizing a magnetic flux leakage directed along a radius of the pipe.

4. The method of claim 1, wherein the defect is determined to be internal when the first threshold value is greater than the discrimination threshold, and the defect is determined to be external when the first threshold value is smaller than the discrimination threshold.

5. The method of claim 1, wherein the first threshold value is a peak amplitude of the first portion of the magnetic field in vicinity of the defect.

6. The method of claim 5, wherein the first portion of the magnetic field is generated in part by a current in the pipe, the current in the pipe induced by the first sensor.

7. The method of claim 1, wherein the second sensor acquired the second portion of the magnetic field in vicinity of the defect.

8. The method of claim 1, wherein the first magnetic field is a superposition of the magnetic flux leakage directed along a radius of the pipe and a magnetic field generated by an eddy current in a portion of the pipe adjacent to the first sensor, wherein the eddy current is induced by an alternating magnetic field generated by the first sensor.

9. The method of claim 1, wherein computing the discrimination threshold includes multiplying the speed with the second portion of the magnetic field forming a threshold radial component and compensating for a noise threshold associated with the second sensor.

10. A non-transitory computer program product storing instructions, which when executed by at least one data processor of at least one computing system, implements a method comprising:
receiving data characterizing a first portion of a magnetic field detected by a first sensor, a second portion of the magnetic field detected by a second sensor, and a speed associated with the second sensor detected by a velocity sensor coupled to the first or the second sensor,
wherein the first sensor, the second sensor and the velocity sensor are included in a pipeline inspection gauge configured to inspect a pipe, wherein the second portion of the magnetic field includes magnetic flux leakage directed along a radius of the pipe;
discriminating, using the received data, a defect in a pipe as one of internal and external, the discriminating comprising:
computing a discrimination threshold based on the second portion of the magnetic field and the speed of the second sensor,
comparing a first threshold value associated with data characterizing the first portion of the magnetic field to the discrimination threshold,
determining the defect as one of internal and external based on the comparison; and
providing data characterizing the defect as one of internal and external.

11. The computer program product of claim 10, wherein the discrimination threshold is computed by scaling a second threshold value associated with the second portion of the magnetic field by the speed associated with the second sensor and adding a noise threshold associated with the first sensor.

12. The computer program product of claim 11, wherein the second threshold value is a peak amplitude of a radial component, the radial component characterizing a magnetic flux leakage directed along a radius of the pipe.

13. The computer program product of claim 10, wherein the defect is determined to be internal when the first threshold value is greater than the discrimination threshold, and the defect is determined to be external when the first threshold value is smaller than the discrimination threshold.

14. The computer program product of claim 10, wherein the first threshold value is a peak amplitude of the first portion of the magnetic field in vicinity of the defect.

15. The computer program product of claim 14, wherein the first portion of the magnetic field is generated in part by a current in the pipe, the current in the pipe induced by the first sensor.

16. The computer program product of claim 10, wherein the second sensor acquired the second portion of the magnetic field in vicinity of the defect.

17. A system comprising:
at least one data processor;
memory storing instructions which, when executed by the at least one data processor, causes the at least one data processor to perform operations comprising:
receiving data characterizing a first portion of a magnetic field detected by a first sensor, a second portion of the magnetic field detected by a second sensor, and a speed associated with the second sensor detected by a velocity sensor coupled to the first or the second sensor,
wherein the first sensor, the second sensor and the velocity sensor are included in a pipeline inspection gauge configured to inspect a pipe, wherein the second portion of the magnetic field includes magnetic flux leakage directed along a radius of the pipe;
discriminating, using the received data, a defect in a pipe as one of internal and external, the discriminating comprising:
computing a discrimination threshold based on the second portion of the magnetic field and the speed of the second sensor,
comparing a first threshold value associated with data characterizing the first portion of the magnetic field to the discrimination threshold,
determining the defect as one of internal and external based on the comparison; and
providing data characterizing the defect as one of internal and external,
wherein one or more of the first determining, first transmitting, first receiving, second determining, third determining, and second transmitting are performed using at least one data processor.

18. The system of claim 17, wherein the discrimination threshold is computed by scaling a second threshold value associated with the second portion of the magnetic field by the speed associated with the second sensor and adding a noise threshold associated with the first sensor.

19. The system of claim 18, wherein the second threshold value is a peak amplitude of a radial component, the radial component characterizing a magnetic flux leakage directed along a radius of the pipe.

20. The system of claim 17, wherein the defect is determined to be internal when the first threshold value is greater than the discrimination threshold, and the defect is determined to be external when the first threshold value is smaller than the discrimination threshold.

21. The system of claim 17, wherein the first threshold value is a peak amplitude of the first portion of the magnetic field in vicinity of the defect.

22. The system of claim 21, wherein the first portion of the magnetic field is generated in part by a current in the pipe, the current in the pipe induced by the first sensor.

23. The system of claim 17, wherein the second sensor acquired the second portion of the magnetic field in vicinity of the defect.

24. The system of claim 17, wherein computing the discrimination threshold includes adding a noise threshold associated with the second sensor to a product of the speed associated with the second sensor and a radial component of the second portion of the magnetic field raised to a predetermined power.

* * * * *